United States Patent [19]

Barree

[11] E Patent Number: Re. 33,246

[45] Reissued Date of Patent: Jul. 3, 1990

[54] HIGH SPEED, HIGH TEMPERATURE THREE-WAY VALVE FOR SWITCHING HIGH PRESSURE FLUIDS UNDER LOW PRESSURE CONTROL

[75] Inventor: Robert D. Barree, Littleton, Colo.

[73] Assignee: Marathon Oil Company, Findlay, Ohio

[21] Appl. No.: 408,159

[22] Filed: Sep. 6, 1989

Related U.S. Patent Documents

Reissue of:

[64] Patent No.: 4,726,398
Issued: Feb. 23, 1988
Appl. No.: 942,566
Filed: Dec. 16, 1986

[51] Int. Cl.[5] ..... F16K 11/044

[52] U.S. Cl. ..... 137/625.5; 137/625.66

[58] Field of Search ..... 137/625.5, 625.66

[56] References Cited

U.S. PATENT DOCUMENTS 3,002,532 10/1961 Carlson .
3,016,917 1/1962 Hunt .
3,510,103 5/1970 Carsello .
3,570,541 3/1971 Franz et al. .
3,587,156 6/1971 Sorenson .
3,762,443 10/1973 Sorenson .
3,794,075 2/1974 Stoll et al. .
3,902,526 9/1975 Brake et al. .
4,027,700 6/1977 Perkins .
4,067,357 1/1978 Ruchser .
4,103,711 8/1978 Arvin .
4,209,040 6/1980 Peters .
4,217,934 8/1980 Peters .
4,567,914 2/1986 Coppola et al. .

FOREIGN PATENT DOCUMENTS 350160 12/1960 Switzerland .
364152 10/1962 Switzerland .

*Primary Examiner*—Gerald A. Michalsky
*Attorney, Agent, or Firm*—Jack L. Hummel; Jack E. Ebel

[57] ABSTRACT

Disclosed is a low internal volumn three-way valve for high speed switching of high pressure, high temperature fluids without volume change. Such valves have particular application with positive displacement pumps for precision laboratory measurements wherein corrosive fluids are used.

9 Claims, 9 Drawing Sheets

Fig. 4
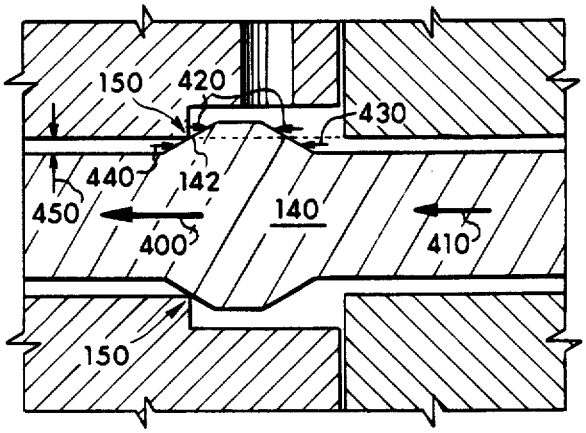
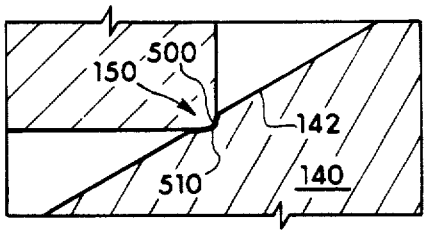
Fig. 5
Fig. 6
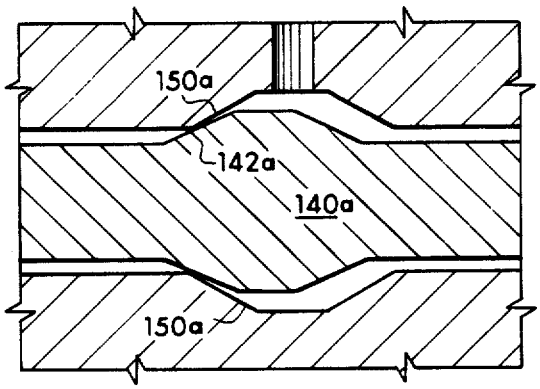

HIGH SPEED, HIGH TEMPERATURE THREE-WAY VALVE FOR SWITCHING HIGH PRESSURE FLUIDS UNDER LOW PRESSURE CONTROL

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a three way sliding poppet valve for switching high pressure, high temperature fluids under low pressure control and, in particular, this invention relates to a low internal volume three way valve for high speed switching of high pressure, high temperature fluids without volume change for precision laboratory measurements such as is encountered in permeameter tests with corrosive fluids involving core samples.

2. Description of the Prior Art

In permeameter tests, high temperature (such as 280 degrees Fahrenheit) and high pressure (such as 10,000 psi) corrosive fluids (such as brine, oil, and gas) are injected into core samples to measure relative or specific permeability of the core sample. A computer operated permeameter requires a multi-port, three way valve capable of zero volume change and having low internal volume as well as a rapid response time. One prior art approach used VALCO rotary valves such as those manufactured by Valco Instruments, Inc., P.O. Box 55603, Houston, Tex. 77255. These rotary valves, however, have small flow paths and a slow response time such as 0.5–2.0 seconds.

Prior to the filing of the present invention, a patentability search was conducted resulting in the following patents:

| Inventor | Patent No. | Date |
|---|---|---|
| C. M. Carlson | 3,002,532 | 10-03-61 |
| N. C. Hunt | 3,016,917 | 01-16-62 |
| Maurice F. Franz | 3,570,541 | 03-16-71 |
| Gerald Sorenson | 3,587,156 | 06-28-71 |
| Gerald Sorenson | 3,762,443 | 10-02-73 |
| Stoll et al. | 3,794,075 | 02-26-74 |
| Brake et al. | 3,902,526 | 09-02-75 |
| Charles Perkins | 4,027,700 | 06-07-77 |
| Erich Ruchser | 4,067,357 | 01-10-78 |
| Paul Arvin | 4,103,711 | 08-01-78 |
| Clifford Peters | 4,209,040 | 06-24-80 |
| Clifford Peters | 4,217,934 | 08-19-80 |
| Coppola et al. | 4,567,914 | 02-04-86 |

The 1971 and 1973 patents to Sorenson pertain to the method of manufacturing a pressurized fluid control valve utilizing a valve spool centrally located in a valve body. The embodiment shown in FIG. 17 of Sorenson shows a multi-passage valve utilizing a symmetrically shaped spool wherein the spool has an incline surface that seats against a sharp circular edge formed in the body. The Sorenson spool or valve body is constructed of deformable resilient materials such as polyurethane, neoprene, polyethylene, or rubber. Deformability of the valve spool or body of Sorenson is critical since in the manufacturing of the valve, the spool or body must deform in order to be inserted into the body. After the insertion, the deformed part recovers to its original condition. In such an embodiment, the forces of deformation are much greater than the forces experienced by the valve in operation. As such, it is believed that the valve of Sorenson would not be suitable to the high temperature, high pressure environments for which the valve of the present invention is ideally suited. Furthermore, Sorenson requires fluid exhaust ports. The present invention has no exhaust ports since it is applied to the flow of high pressure, high temperature fluids which must be completely contained within the valve. Sorenson relies on multiple annular rings providing simultaneous multiple seals caused by moving the spool. The current invention requires only one sealing surface to contact the spool at a time. Sorenson valves are commonly known as 4-way valves, whereas the present valve is specifically a 3-way valve. Finally, the present valve provides means of applying very large forces to a sealing line formed by the poppet (or spool) contacting the sealing surface in the body, namely the large diameter pistons.

The 1974 patent to Stoll (U.S. Pat. No. 3,794,075) sets forth a multi-way valve having a switching time of six milliseconds and exhibiting short physical valve travel. The Stoll invention makes use of disc plane seals located on a symmetrical center spool. The spool is driven by the snap action of opposing diaphragms which are hydraulically activated. The rubber diaphragms comprising the spool end seals and snap action diaphragms make this valve unsuitable for high pressure applications. High internal pressures would collapse these parts causing the valve to fail. The central O-ring seal of the spool is not constrained so that back pressure on the seal would unseal the O-ring causing leakage. This is not the case in the present invention. Because of flexure of the rubber parts some internal volume change must occur in the Stoll valve after the seals make initial contact. This volume change will compress the fluid in one part of the valve causing a pressure change. This problem does not exist in the present invention. Under high differential pressure the unsupported elastomeric seals used by Stoll may experience extrusion. The problem is accentuated at high temperature. The present valve uses metallic sealing surfaces to eliminate the problem.

The 1962 patent issued to Hunt (U.S. Pat. No. 3,016,917) sets forth a valve for controlling high pressure fluid. The valve plunger of Hunt has an enlarged central body portion terminating in an angled seating surface on an enlargement of the valve which selectively abuts against a corresponding angled seat in the cavity. Hunt utilizes a metal to metal engagement between the valve enlargement and the seat to provide a seal against leakage of fluid pressure. The valve is held in the closed position by means of a solenoid and is returned to the opened condition by means of a spring. In this embodiment the central valve spool is not hydrostatically balanced.

The 1971 patent to Franz (U.S. Pat. No. 3,570,541) sets forth a three way directional control valve having a formed poppet member located internally to a body wherein the body has internally disposed conically shaped seats for selective engagement with the poppet member to open and close the three way valve. The poppet member and seat incorporate an elastomeric material. The Franz valve is designed to operate at 100 psi with an activating piston driven valve control operating at 70 psi.

The 1986 patent to Coppola (U.S. Pat. No. 4,567,914) relates to a two-stage hydraulic solenoid valve having a centrally disposed poppet member having incline surfaces that selectively seat with conical seats. The Coppola invention is designed for steam turbine control systems.

The 1978 patent to Ruchser (U.S. Pat. No. 4,067,357) relates to a sliding/spool direction control valve wherein the spool is of symmetrical construction and is driven by two opposing control pistons. The Ruchser embodiment provides a novel seating arrangement that selectively seals despite loss of tolerances due to wear, manufacturing, or use.

The remaining patents uncovered in the search are not as pertinent to the present invention as those discussed above.

SUMMARY OF INVENTION

In the environment of making relative permeability measurements on core samples, high temperature and high pressure corrosive fluids must be quickly switched by means of a fast acting valve that does not change the volume of the valve during switching to preserve the accuracy of the permeability measurements. Similar high pressure and high temperature environments exist in other types of measurements and the valve of the present invention finds particular application in use with positive displacement pumps for precision laboratory measurements.

The present invention provides a fast acting valve being capable of switching in less than fifteen milliseconds, exhibiting no change in the volume of the valve during switching, and having an actuation travel of less than 0.03 inches. And, the valve of the present invention can be controlled with low pressures less than two orders of magnitude less than the high pressure of the fluid.

The present invention includes a metal valve body composed of material withstanding the high temperatures and high pressures of the corrosive fluid having formed therein input and two output ports. A cavity is formed within the valve body which forms two fluid passageways between the input and the first output port and between the input and the second output port. An elongated metal spool, also composed of material capable of withstanding the high temperatures and pressures of the corrosive fluid is disposed within the formed cavity and is responsive to low pressures placed on opposing pistons on opposite ends of the spool for selectively activating the valve to switch between the first and second passageways. The spool has a central raised portion terminating in opposing conical shaped spool seats which selectively seal against valve seats formed in the valve body to seal the two fluid passageways from each other. The input port is located over the center of the formed cavity containing the central raised spool portion.

DETAILED DESCRIPTION

Figure 1:
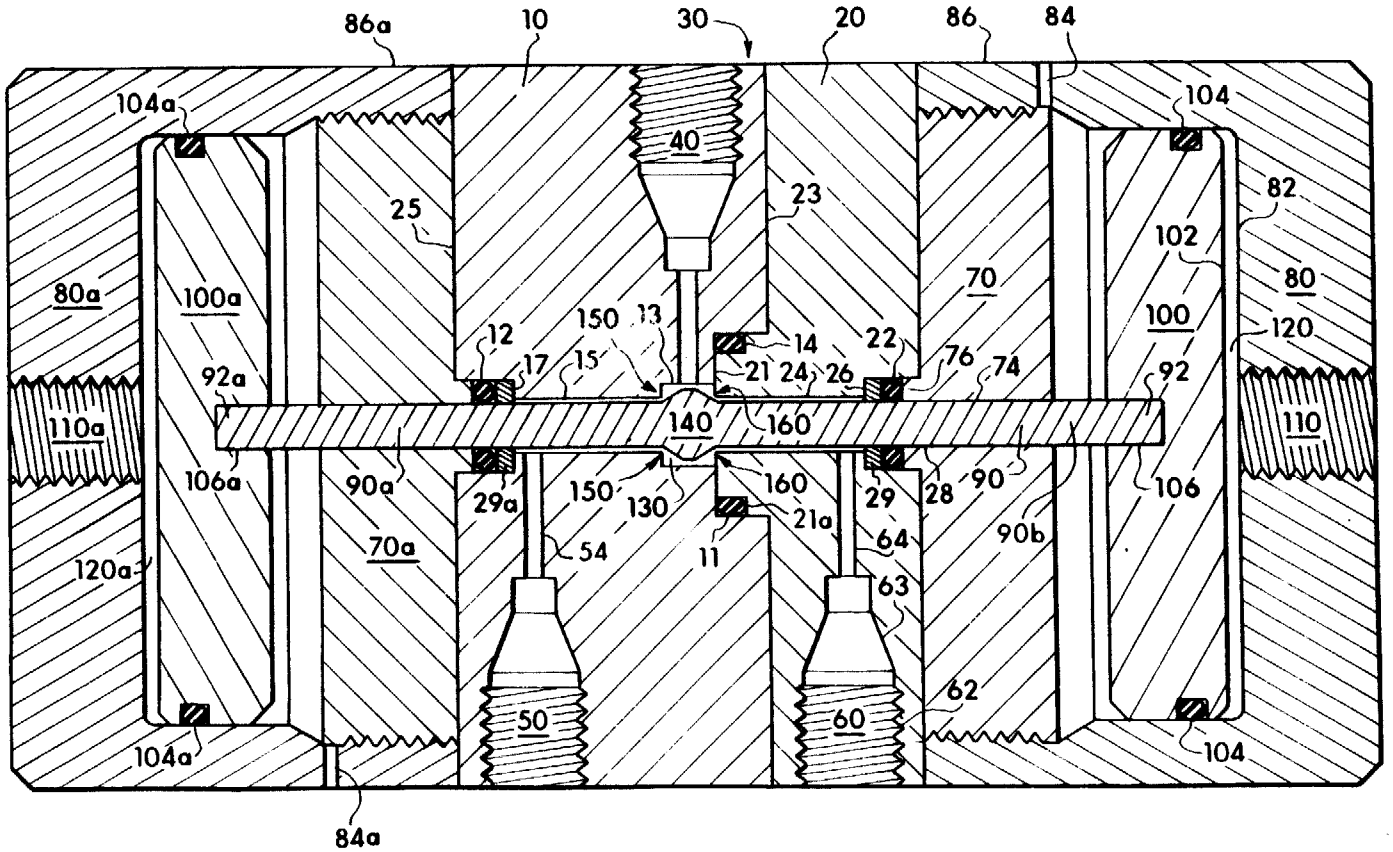
In FIG. 1, the high pressure, high temperature three way valve of the present invention is set forth in full cross-section, In FIGS. 2 and 3, the operation of the three way valve of the present invention set forth in FIG. 1 is shown, In FIG. 4, the details of the central raised portion of the spool engaging the valve seats of the present invention are set forth, In FIG. 5, the details of the actual engagement between the spool seat and the valve seat are detailed, FIG. 6 sets forth an alternate embodiment for the valve of the present invention.

In FIG. 1, the details of the three way valve of the present invention are set forth to include a main body 10 and a second body 20 both machined from material known as HASTELLOY C-276. HASTELLOY C-276 is a nickel alloy with a yield strength of approximately 70,000 psi. Its primary advantage is its extreme corrosion resistance to brines, hydrogen sulfides, and other chemicals found in petroleum reservoirs at temperatures up to 400° F. The metal itself will operate at much higher temperatures. Therefore, this type of material withstands the high temperatures and the high pressures of the corrosive fluid that are switched in the valve of the present invention. The two bodies 10 and 20 are machined to fit together to form a combined structure having three formed ports 40, 50, and 60 contained therein. Formed port 40 is a fluid inlet, whereas formed ports 50 and 60 are fluid outlets. As mentioned for permeability tests, the fluids may comprise gas or liquid corrosives at high pressures over 8,000 psig and up to 10,000 psig. In addition, the valve functions at temperatures from ambient 70° F. up to 250–350 degrees Fahrenheit. The only temperature limitation is the Viton elastomer material on the piston and shaft seals. Using Teflon material, temperatures of up to 500° F. could be attained. Pressures may range from less than 1.00 psi to 10,000 psi.

On opposing ends of bodies 10 and 20 are located threaded rings 70 and 70a. Engaging threaded rings 70 and 70a are opposing end caps 80 and 80a. Disposed centrally through combined body 30 (i.e., first body 10 and second body 20 and rings 70 and 70a) is the spool 90 of the present invention having a raised middle portion 140 with a first 90a and a second 90b opposing longitudinal shafts. Resting against opposing ends 92 and 92a of spool 90 are the piston heads 100 and 100a. The formed ports 110 and 110a are centrally located in opposing end caps 80 and 80a. A fluid, for example, low air pressure of 80 psig is selectively delivered into the formed ports 110. The formed port 110 provides fluid communication through the end cap 80 and into a formed cavity 120 located between the inner wall 82 of the end cap 80 and the outer surface 102 of the piston head 100.

Figure 7:
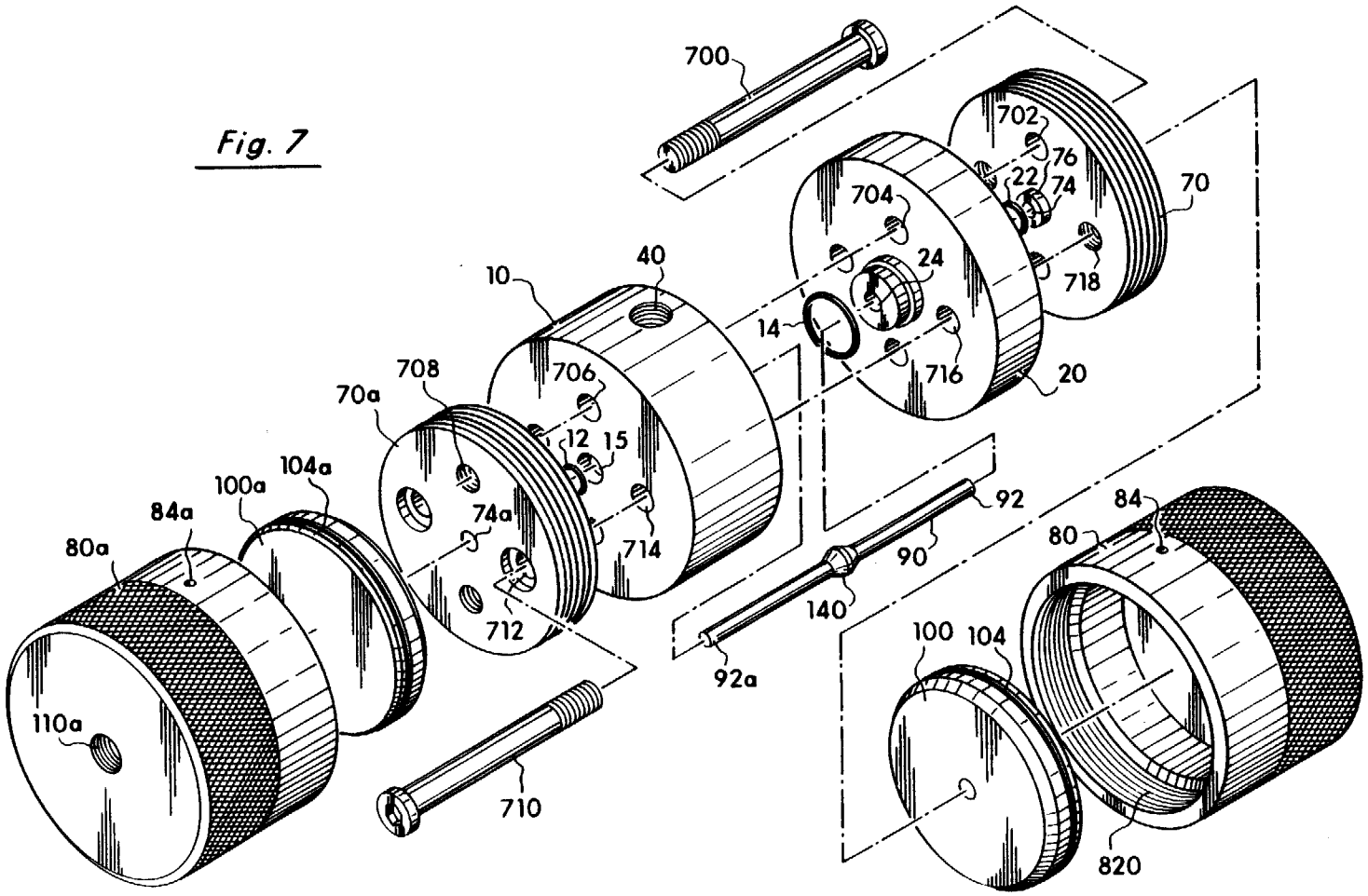
FIG. 7 is an exploded perspective view showing the components of the present invention.

O-rings 104 fit around the piston 100 to provide a fluid seal between chamber 120 and the rest of the apparatus. Likewise, an O-ring seal 22 is provided in body 20 and around shaft 90 between body 20 and threaded ring 70. Likewise, an O-ring seal 12 is provided between body 10 and threaded ring 70a along the shaft 90. The O-rings 12 and 22 form pressure seals and are preloaded using an external packing assembly and spacer ring 29. The external packing assembly is comprised of the threaded rings 70 and 70a. These rings are drawn together, as shown in FIG. 7, by four Allen head cap screws 700 and 710 which serve to hold the rings 70 and 70a and body parts 10 and 20 together. When tightened the bolts 700 and 710 also cause the O-rings 12 and 22 to be compressed causing a static seal around shaft 90. The spacer rings 29 and 29a placed inside O-rings 12 and 22 insure a pressurized fluid path across the front face of the O-rings 12 and 22. This provides a dynamically actuated seal with the sealing force being proportional to the applied pressure. In addition, an O-ring seal 14 is provided between bodies 10 and 20.

A chamber 130 is provided between the inlet fluid port 40 and the two outlet fluid ports 50 and 60. The fluid O-ring seals 12, 14, and 22 selectively seal chamber 130 from the rest of the apparatus. The end cap 80 releasably engages the threaded ring 70 and when threaded over ring 70 provides a firm engagement to the end cap 80 to fully define the chamber 120.

Figure 2:
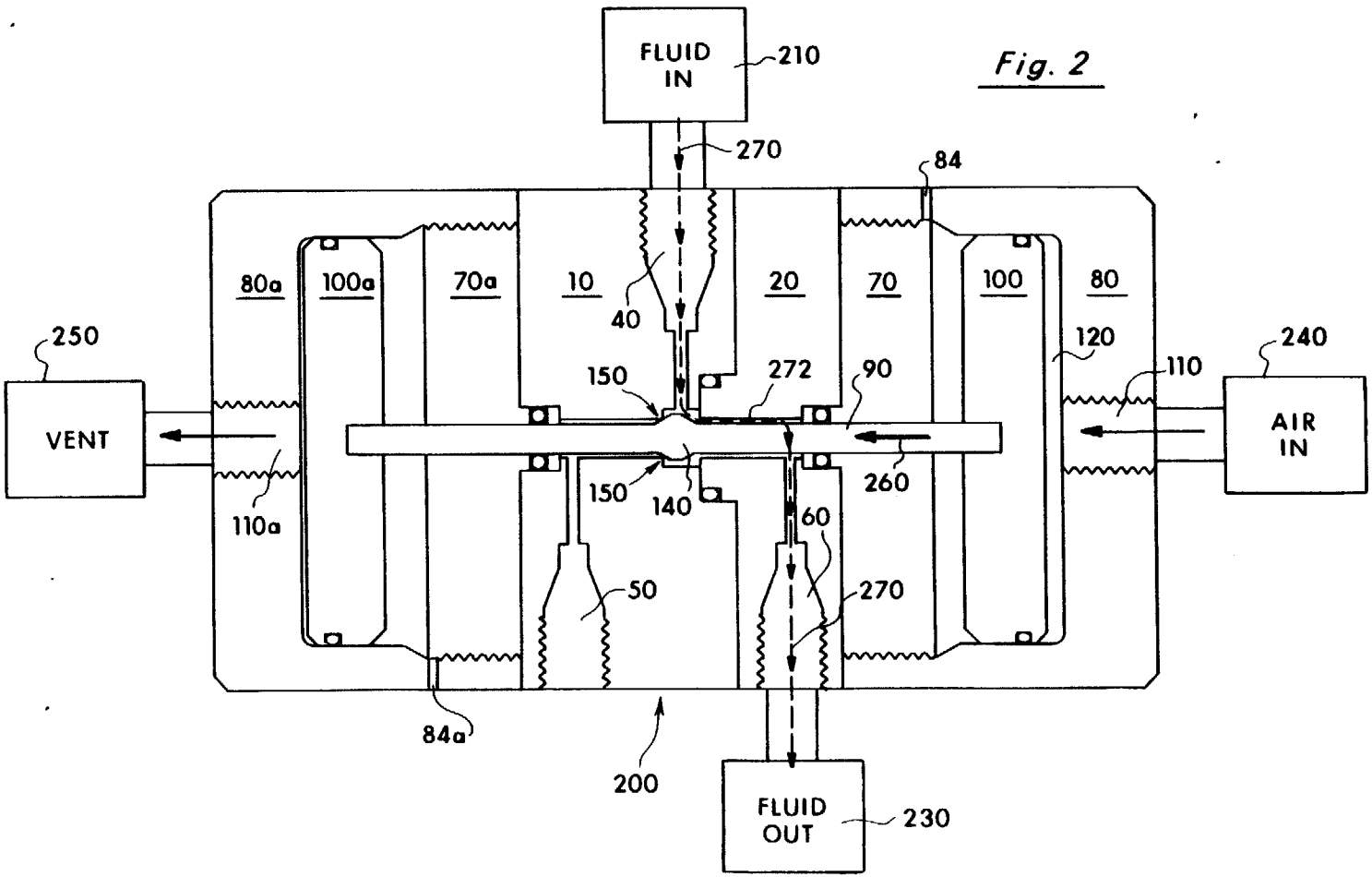
Figure 3:
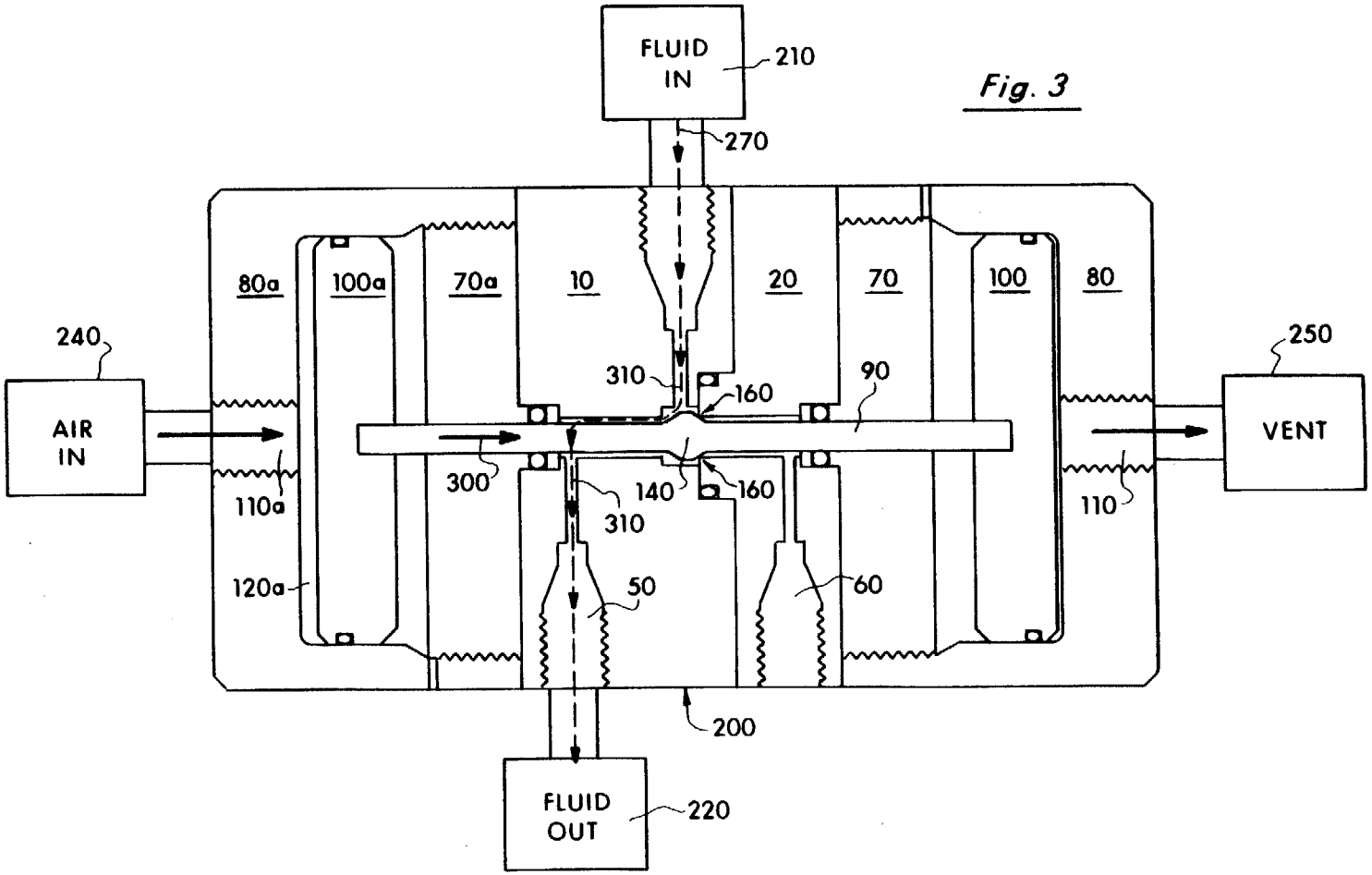

In FIGS. 2 and 3, the operation of the present invention is set forth in illustrated form. The apparatus 200 of the present invention is interconnected with a fluid input source 210, to fluid output sources 220 and 230, and to air input/vent sources 240 and 250. The fluid input source 210 is conventionally interconnected with port 40 and the two fluid receivers 220 and 230 are conventionally interconnected with ports 50 and 60 respectively. The two air input/vents 240 and 250 are interconnected with ports 110 and 110a, respectively. Hence, in operation, when a low pressure gas such as air, at 80 psig, is delivered into cavity 120, piston 100 drives in direction of arrow 260 to firmly seat spool 90 against edge 150. Port 84 vents the rear side of piston 100 to atmosphere and permits the piston to travel. This enables the fluid 270 delivered from the fluid input source 210 to be delivered in the direction of arrows 272 downwardly through port [260] *60* and into the second fluid output or receiver 230. Hence, the flow of the high pressure, high temperature fluid is through a formed passageway from the input port 40 to the second output port 60. Likewise, in FIG. 3, the spool 90 is delivered in the direction of arrow 300 so that spool 90 firmly seats against edges 160. In this manner, fluid 270 is delivered in the direction of arrows 310 into the fluid output 220. Hence, the flow of the high pressure, high temperature fluid is through a formed passageway from the input port 40 to the second output port [60] *50*.

In FIG. 4, the raised portion 140 of the spool 90 is shown selectively seating against circular edge 150 which comprises the valve seat. In the embodiment shown in FIG. 4, the valve seat 150 is a right angle edge engaging the spool seat which is an inclined angle 142 of approximately thirty degrees from horizontal. When the spool seat 140 engages the valve seat 150, the total resultant force 400 as shown in FIG. 4 is principally equal to the force 410 corresponding to the low gas pressure such as 80 psig being delivered in from source 240 and impacting upon the piston 100.

The force 410 is transmitted from the piston 100 as pi times the radius (r) squared times the pressure (p). In the preferred embodiment where the radius of the piston is 0.81 inches and the pressure is 80 psi, the force 410 is 165 1bf. There are other forces present. Forces 420 act on both sides of port 140 and counteract each other to provide no net effect on combined force 400. Force 430 consists of the fluid pressure (up to 10,000 psi) acting on the annular space 450 between shaft 90 and body 20 with diameters, in the preferred embodiment of 0.125 and 0.150 inches, respectively. At 10,000 psi, this contributes a force of 54 1bf. At the same time, force 440 opposes closing of the valve by applying the outlet fluid pressure to the same annular area 450. Hence, before closing of the valve forces 430 and 440 balance exactly so the only net force is 410.

An alternate embodiment for the valve 140 is shown by valve 140a in FIG. 6 engaging a circular edge 150a wherein the angled side 142a of valve 140a selectively abuts against the inclined edge 150a. In this embodiment, the angle of inclinations of circular edge 150a and surface 142a differ slightly. The angled surface 150a must have an included angle slightly larger than the angle included by surface 142a. A difference of angles of 2°-5° is sufficient. This arrangement allows a line seal to be maintained at low stresses. As the applied load forcing the surfaces 150a and 142a together increases the material at the sealing line deforms elastically to increase the area of contact thus reducing the stress and decreasing the possibility of permanently deforming the parts.

FIG. 7 sets forth, in perspective view, the assembly of the present invention. In FIG. 7, the shaft 90 is inserted through formed passageway 24 of body 20 and then through formed passageway 74 of threaded ring 70. Likewise, end 92a of shaft 90 is placed through formed passageway [14] *15* of body 10 and through formed passageway 74a of threaded ring 70a. Once bodies 10 and 20 are placed over the shaft 90 and the threaded rings 70 and 70a are placed over ends 90 and 92a, two bolts 700 are inserted through passageways 702 of threaded ring 70, 704 of body 20, and 706 of body 10 to engage threaded region 708 of threaded ring 70a. Likewise two opposing bolts 710 are inserted through passageways 712 of ring 70a, [713] *714* of body 10 and 716 of body [12] *20* to engage threaded region 718 of ring 70. The opposing bolts 700 and 710 are tightened to firmly hold threaded rings 70 and 70a to the combined body 30. After tightening of the bolts 700, the pistons 100 and 100a are placed over ends 92 and 92a respectively of shaft 90 and the end caps 80 and 80a are screwed onto the threaded rings 70 and 70a, respectively. In this fashion, the three way valve [12] of the present invention is totally assembled.

Figure 8:
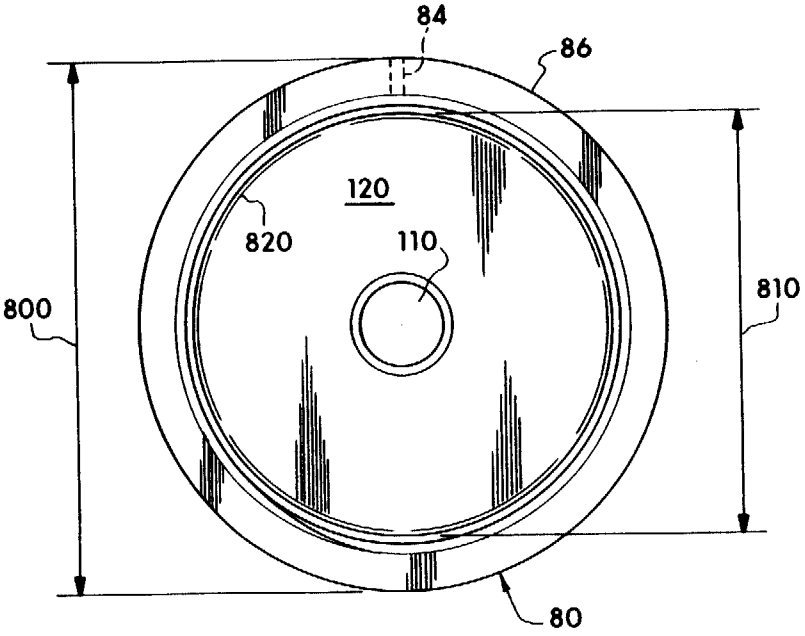
FIG. 8 is a side planar view of the piston end caps of the present invention.

The details of the end cap 80 and 80a are shown in FIG. 8. In FIG. 8, the end cap 80 is preferably machined from material such as aluminum and after machining is hard-anodized to one mill thickness. The vent 84 is drilled through the side 86 of the end cap 80. In the preferred embodiment, the end cap 80 has an outside diameter of 2.00 inches as shown by arrow 800. Cavity 120 has an inside diameter of 1.625 inches in diameter as shown by arrow 810. The port 110 typically has an inside diameter of 5/16ths of an inch. Internal threads 820 are provided as shown.

Figure 9:
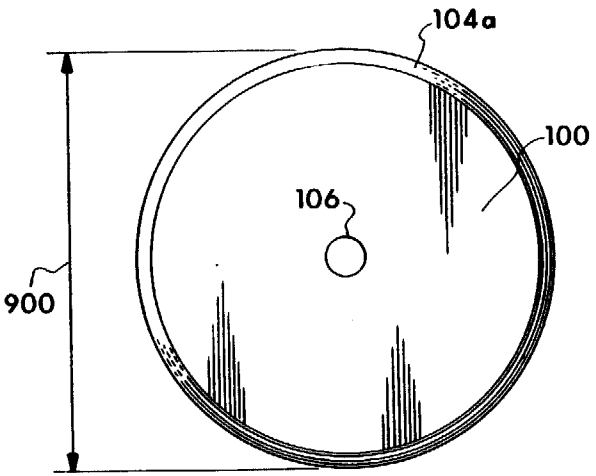
FIG. 9 is a side planar view of the piston of the present invention.

In FIG. 9, the details of the piston 100 are shown. In the preferred embodiment, the outside diameter of the piston 100 is 1.620 inches as shown by arrow 900 and the inner diameter of the formed slot 106 is 0.127 inches. The formed opening 106, as shown in FIG. 1, extends substantially into the piston 100 and, in the preferred embodiment, the piston is 0.32 inches in thickness and formed opening 106 extends inwardly 0.262 inches. A formed slot 104a extends arround the outer surface of the piston head to receive the O-ring 104. The piston head 100 in the preferred embodiment is machined from aluminum material.

Figure 10:
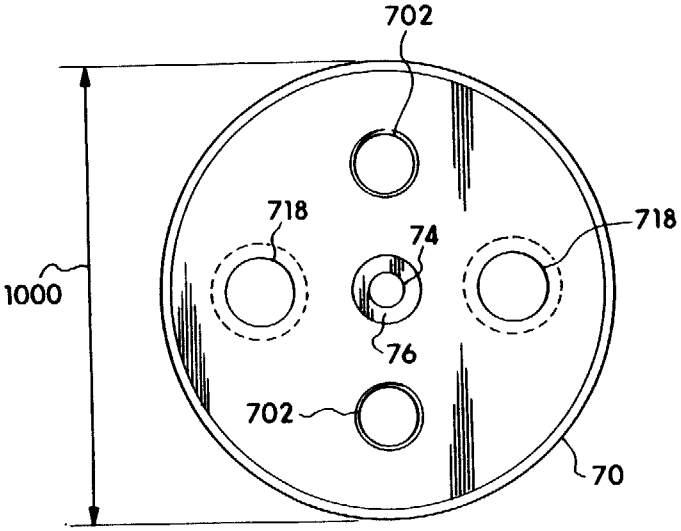
FIG. 10 is a side planar view of the packing ring of the present invention.

The ring 70 is shown in FIG. 10 and, in the preferred embodiment, has an outer diameter of 1.75 inches as shown by arrows 1000. The formed passageway 74 has an inner diameter of 0.125 inches. The threaded ring 70 has a boss 76 which engages a corresponding circular cavity 26 in body 20. The diameter of boss 76 is 0.25 inches. The holes 702 and 718 for receiving the bolts 700 and 710 are shown in FIG. 10.

Figure 11:
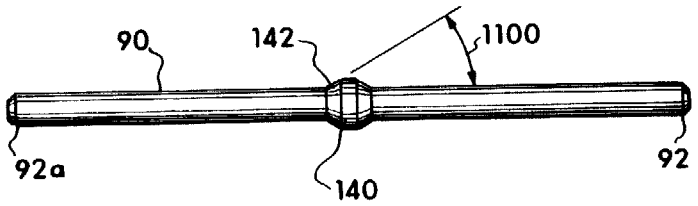
FIG. 11 is a side planar view of the spool of the present invention.

In FIG. 11, the details of the spool 90 are shown. The spool 90 is preferably made from a corrosion resistant material such as Hastelloy C-276. In another embodiment a much harder material such as Satellite 6B can be used. This material possesses slightly less corrosion resistance but is more resistant to wear and deformation after repeated use. The spool in the preferred embodiment is 2.610 inches long and surface 142 is oriented from horizontal at 30 degrees as shown by arrow 1100.

Figure 12:
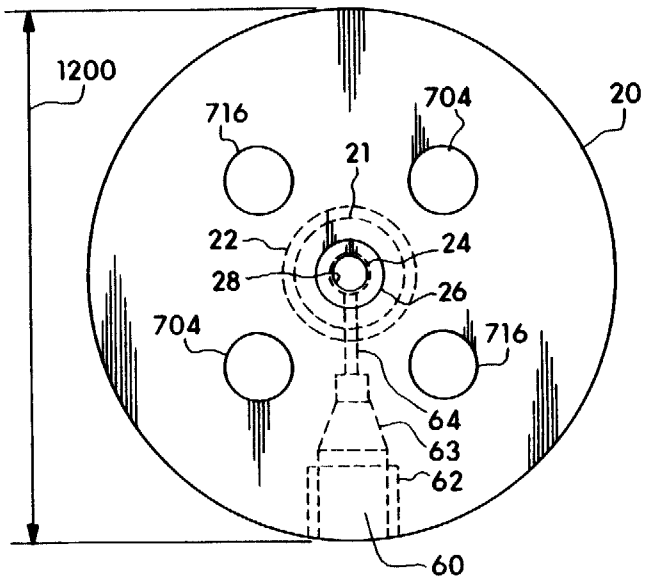
FIG. 12 is a side planar view of the first half of the valve body of the present invention.

In FIG. 12, details of the body 20 are shown. The body 20 has an outer diameter of two inches as shown by arrow, 1200. The body 20 is preferably made from HASTELLOY C-276 material. Holes 704 and 716 are drilled through body 20 to receive bolts 700 and 710. Cavity 26 has an inner diameter of 0.25 inches and receives the boss 76 from the threaded ring 70 to form a region for the O-ring 22 as shown in FIG. 1. Reduced diameter region 28 receives the spool 90 and is integral with the enlarged diameter region 24 which is part of the formed passageway 130 as shown in FIG. 1. Region 24 terminates in edge 160 as shown in FIG. 1. Two raised cylindrical bosses 21 and [26] *21a* are formed on the opposite surface 23 of body 20. As shown in FIG. 1, these bosses 21 and [26] *21a* cooperate with body 10 to form a cavity for O-ring 14. In the preferred embodiment, annular region 21 has an outer diameter of 0.400 inches and annular region [22] *21a* has an outer diameter of 0.500 inches. Also shown in FIG. 12, is the placement of the fluid outlet port 60 which is machined into body 20 in a conventional fashion. Fluid output 60 has a threaded region 62 integral with a region of taper 63 which is in fluid communication with a passageway 64 to cavity 130 as shown in FIG. 1.

Figure 13:
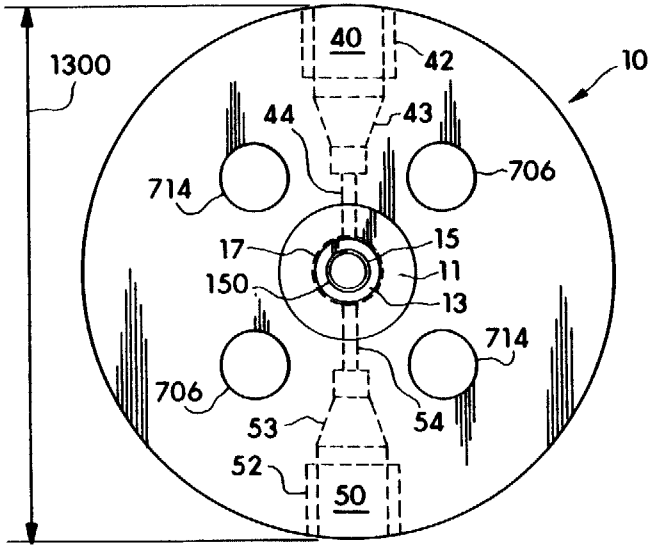
FIG. 13 is a side planar view of the second half of the valve body of the present invention.

In FIG. 13 are the details of the body 10 of the present invention. Body 10 also has an outer diameter as shown by arrow 1300 of 2.00 inches in the preferred embodiment. Holes 706 and 714 are machined through the body for the bolts 700 and 710. The left body 10 is also machined from HASTELLOY- C-276 material. The formed fluid inlet port 40 with its threaded region 42, its taper region 43, and its passageway provides fluid communication with cavity 130 as shown in FIG. 1. Likewise, the fluid outlet port 50 is machined into body 10 and has a threaded region 52, a region of taper 53, and a fluid passageway 54 for putting it in fluid communication with cavity 130. As shown in FIG. 13, the circular cavity 11 in the preferred embodiment has an inner diameter of 0.500 inches. A second and inwardly disposed cavity 13 has located thereon edge 150 and forms part of the chamber 130 as shown in FIG. 1. This inner cavity 13 has, in the preferred embodiment, an inner diameter of 0.219 inches. Area 15 is of reduced diameter which is the preferred embodiment is 0.150 inches and forms the remaining part of cavity 130. This region 15 is in fluid communication with passageway 54 and port 50. Finally, on the opposing surface 25 is an annular cavity 17 receptive of O-ring seal 12 and spacer ring 29a.

When fully assembled, the piston 100 travels, in the preferred embodiment, only 15 to 20 thousands of an inch in order to transfer fluid flow from port 40 to either port 50 or port 60. With the pressures involved, the time for switching the high pressure fluid from the inlet port 40 to either one of the outlet ports 50 or 60 is on the order of 15 milliseconds. The present invention, therefore, provides a hydrostatically balanced three way valve which is symmetrically constructed. The air pressure of 80 pounds psi square inch (gauge) for sources 240 and 250, in the preferred embodiment, provides sufficient pressure to overcome the differential pressure between the fluid inlet port 40 and either one of the outlet ports 50 or 60. Because of the symmetrical arrangement of the valves, upon switching there is no change in the internal volume of the valve and, therefore, the present invention finds significant application in areas such as permeability tests. In prior valves with some volume change during switching, a slight but significant "pumping action" occurs during each valve switch. This causes upsets in the recorded pressure trace and displaces fluid in the valve body. The fluid displacement is cumulative and causes errors in material balance calculations during the displacement. These errors in accounting for the displaced fluid volumes generate significant errors in the final results of the experiment. This does not occur in the valve of the present invention. The valve finds application, in the preferred embodiment, for use in high pressure—high temperature (single phase flow, two phase, and three phase) relative permeameter tests. In such cases, the three way valve of the present invention operates at up to 280 degrees F. and 10,000 psig in the presence of corrosive fluids such as brine, oil, and gas. Clearly the valve of the present invention finds application in other high temperature and high pressure environments including other precision laboratory measurements.

Figure 14:
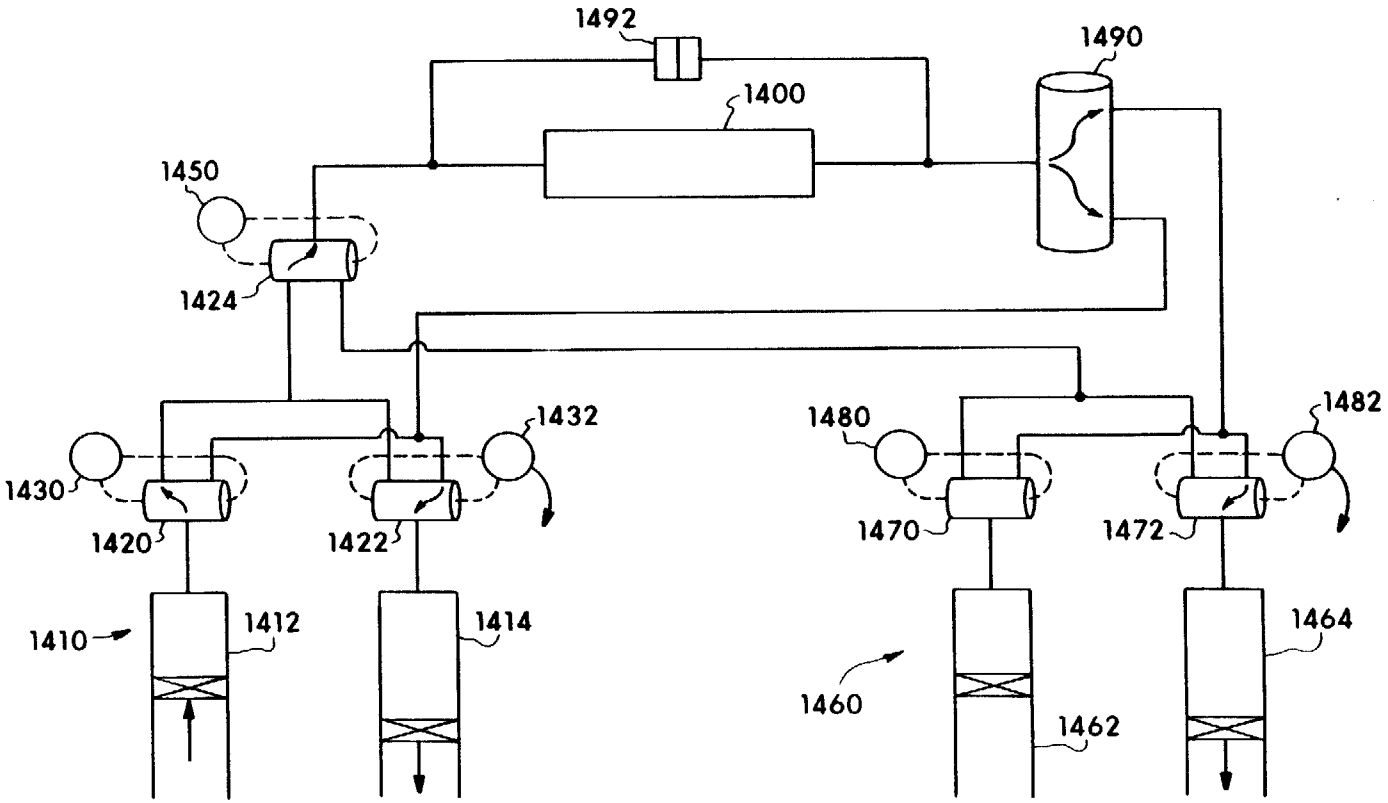
FIG. 14 is a block diagram showing the valves of the present invention interconnected in a relative permeameter.

In FIG. 14, a fluid saturated core sample, not shown, is contained in the core holder of standard Hassler type design 1400. Fluid, such as brine, is injected into the core through a pump 1410, in this case consisting of two positive displacement cylinders 1412 and 1414. Flow into and out of the pump cylinders is directed by 3-way valves 1420, 1422, and 1424 by the present invention which are operated by electric solenoid valves 1430, 1432, and 1450 under computer control. In this way either cylinder 1412 or 1414 may be selected as the inlet or outlet for the pump.

Likewise a second fluid, such as oil, can be delivered into the core sample from a second pump 1460 having cylinders 1462 and 1464. Flow from these cylinders is directed by valves 1470 and [1470] *1472* under control of solenoids 1480 and 1482.

Valve 1450 is used to select between pumps 1410 and 1460 so that the injected fluid may be chosen. This arrangement can be expanded or contracted to allow flow of one, two, three, or more fluids in a similar fashion.

Flow from the core sample enters a separation vessel 1490 where the multiple fluids segregate. Each fluid is then returned to its respective pump through the series of valves 1420, 1422, 1470, and 1472. In this arrangement the fluid can be continuously recirculated through the sample. Flow rate measurements from the pumps and differential pressure 1492 measured across the core provide the data necessary for permeability measurements.

While there has been shown and described what is considered two preferred embodiments of the invention, it is understood that various other modifications may be made therein. It is intended to claim all such modifications which fall within the true spirit and scope of the present invention as set forth in the following claims.

I claim:

1. In combination with a fluid supply, first and second fluid receivers, a low pressure control system, and a high speed three-way valve for switching high temperature, high pressure fluids from said fluid supply under low pressure control by said control system to one of said two fluid receivers, said high temperature being as great as 250 degrees Fahrenheit and said high pressure being as great as 10,000 psig, said three-way valve comprising:

a valve body composed of material capable of withstanding said high temperature and said high pressure without deformation, said body having a formed input port connected to said fluid supply and first and second formed output ports, said first output port being connected to said first fluid receiver and said second output port being connected to said second fluid receiver, a cavity formed in said valve body and in fluid communication with said formed input and said formed first and second output ports, said cavity being of elongated [symmetrical] shape having a formed central cylindrical region and first and second opposing elongated cylindrical regions, the radius of said central region being greater than the radius of said opposing first and second elongated cylindrical regions, said formed input port being in fluid communication [in the center of] *with* said formed central cylindrical region, said first output port being in fluid communication [near the end of] *with* said first elongated cylindrical region and said second output port being in fluid communication [near the end of] *with* said second elongated cylindrical region, the transitions between said central cylindrical region and said opposite elongated cylindrical regions forming first and second valve seats, an elongated symmetrical spool disposed within said formed cavity in said valve body and comprised of material capable of withstanding said high temperature and said high pressure without deformation, said spool having a central raised portion and first and second opposing elongated cylindrical shafts, the radius of said central raised portion being slightly less than the radius of said central cylindrical region of said cavity, the radius of said first and second opposing elongated cylindrical shafts being slightly less than the radius of said first and second opposing elongated cylindrical regions, the transitions between said central raised portion of said spool and said first and second opposing shafts forming first and second conical shaped spool seats, said spool cooperating with said valve body to form a first fluid passageway between said formed input port and said first output port when said first spool seat seals against said first valve seat and to form a second fluid passageway between said formed input port and said second output port when said second spool seat seals against said second valve seat, first and second opposing pistons connected to opposite ends of said valve body and to said control system, said first piston engaging to the end of said first elongated cylindrical shaft of said spool and said second piston engaging to the end of said second elongated cylindrical shaft of said spool, the diameter of said first and second opposing pistons being at least ten times greater than the sealing diameter of said central raised portion of said shaft, means located in said valve body and around said first and second opposing elongated cylindrical shafts for sealing said high temperature, high pressure fluid in said first and second formed passageways, said first piston being responsive to a low pressure signal from said control system for driving said spool towards said second valve seat so as to firmly engage said second spool seat against said second valve seat to seal said high pressure, high temperature fluid in said [first] *second* passageway for delivery to said second outlet port, and said second piston being responsive to a low pressure signal from said control system for driving said spool towards said first valve seat so as to firmly engage said first spool seat against said first valve seat to seal said high pressure, high temperature fluid in said [second] *first* passageway for delivery to said [second] *first* outlet port, said time of travel of said spool between said first and said second valve seals occurring in less than fifteen milliseconds and said distance of travel of said spool being less than 0.03 inches with no volume change in the flow of said high temperature, high pressure fluid during said travel of said spool, said low pressure from said control system being at least two orders of magnitude less than said high pressure of said fluid.

2. The three-way valve of claim 1 wherein said first and second valve seats each comprise a ninety degree transition between said central cylindrical region and said opposite elongated cylindrical regions of said formed cavity.

3. The three-way valve of claim 1 wherein said first and second valve seats each comprise an angle of transition between said central cylindrical region and said opposite elongated cylindrical regions of said formed cavity that is larger than the angle of said first and second spool seats.

4. In combination with a fluid supply, first and second fluid receivers, a low pressure control system, and a high speed three-way valve for switching high temperature, high pressure fluids from said fluid supply under low pressure control by said control system to one of said two fluid receivers, said high temperature as great as 250 degrees Fahrenheit and said high pressure being as great as 10,000 psig, said three-way valve comprising:

a valve body composed of material capable of withstanding said high temperature and said high pressure without deformation, said body having a formed input port connected to said fluid supply and first and second formed output ports, said first output port being connected to said first fluid receiver and said second output port being connected to said second fluid receiver, a cavity formed in said valve body and in fluid communication with said formed input and said formed first and second output ports, said cavity being of elongated [symmetrical] shape having a formed central cylindrical region of larger radius and first and second opposing elongated cylindrical regions, the radius of said central region being greater than the radius of said opposing first and second elongated cylindrical regions, said formed input port being in fluid communication [in the center of] *with* said formed central cylindrical region, said first output port being in fluid communication [near the end of] *with* said first elongated cylindrical region and said second output port being in fluid communication [near the end of] *with* said second elongated cylindrical region, the transitions between said central cylindrical region and said opposite elongated cylindrical regions forming first and second valve seats, an elongated symmetrical spool disposed within said formed cavity in said valve body and comprised of material capable of withstanding said high temperature and said high pressure without deformation, said spool having a central raised portion and first and second opposing elongated cylindrical shafts, the radius of said central raised portion being slightly less than the radius of said central cylindrical region of said cavity, the radius of said first and second opposing elongated cylindrical shafts being slightly less than the radius of said first and second opposing elongated cylindrical regions, the transitions between said central raised portion of said spool and said first and second opposing shafts forming first and second conical shaped spool seats, said spool cooperating with said valve body to form a first fluid passageway between said formed input port and said first output port when said first spool seat seals against said first valve seat and to form a second fluid passageway between said formed input port and said second output port when said second spool seat seals against said second valve seat, first and second opposing pistons connected to opposite ends of said valve body and to said control system, said first piston engaging to the end of said first elongated cylindrical shaft of said spool and said second piston engaging to the end of said second elongated cylindrical shaft of said spool, means located in said valve body and around said first and second opposing elongated cylindrical shafts for sealing said high temperature, high pressure fluid in said first and second formed passageways, said first piston being responsive to a low pressure signal from said control system for driving said spool towards said second valve seat so as to firmly engage said second spool seat against said second valve seat to seal said high pressure, high temperature fluid in said [first] *second* passageway for delivery to said second outlet port, and said second piston being responsive to a low pressure signal from said control system for driving said spool towards said first valve seat so as to firmly engage said first spool seat against said first valve seat to seal said high pressure, high temperature fluid in said [second] *first* passageway for delivery to said [second] *first* outlet port, said low pressure from said control system being at least two orders of magnitude less than said high pressure of said fluid.

5. The three-way valve of claim 4 wherein said first and second valve seats each comprise a ninety degree transition between said central cylindrical region and said opposite elongated cylindrical regions of said formed cavity.

6. The three-way valve of claim 4 wherein said first and second valve seats each comprise an angle of transition between said central cylindrical region and said opposite elongated cylindrical regions of said formed cavity that is larger than the angle of said first and second spool seats.

7. In combination with a fluid supply, first and second fluid receivers, a low pressure control system, and a high speed three-way valve for switching high temperature, high pressure fluids from said fluid supply under low pressure control by said control system to one of said two fluid receivers, said three-way valve comprising:

a valve body composed of material capable of withstanding said high temperature and said high pressure without deformation, said body having a formed input port connected to said fluid supply and first and second formed output ports, said first output port being connected to said first fluid receiver and said second output port being connected to said second fluid receiver, a cavity formed in said valve body and in fluid communication with said formed input and said formed first and second output ports, said cavity being of elongated [symmetrical] shape having a formed central cylindrical region of larger radius and first and second opposing elongated cylindrical regions, the radius of said central region being greater than the radius of said opposing first and second elongated cylindrical regions, said formed input port being in fluid communicaiton [in the center of] *with* said formed central cylindrical region, said first output port being in fluid communication [near the end of] *with* said first elongated cylindrical region and said second output port being in fluid communication [near the end of] *with* said second elongated cylindrical region, the transitions between said central cylindrical region and said opposite elongated cylindrical regions forming first and second valve seats, an elongated symmetrical spool disposed within said formed cavity in said valve body and comprised of material capable of withstanding said high temperature and said high pressure without deformation, said spool having a central raised portion and first and second opposing elongated cylindrical shafts, the radius of said central raised portion being slightly less than the radius of said central cylindrical region of said cavity, the radius of said first and second opposing elongated cylindrical shafts being slightly less than the radius of said first and second opposing elongated cylindrical regions, the transitions between said central raised portion of said spool and said first and second opposing shafts forming first and second conical shaped spool seats, said spool cooperating with said valve body to form a first fluid passageway between said formed input port and said first output port when said first spool seat seals against said first valve seat and to form a second fluid passageway between said formed input port and said second output port when said second spool seat seals against said second valve seat, first and second opposing pistons connected to opposite ends of said valve body and to said control system, said first piston engaging to the end of said first elongated cylindrical shaft of said spool and said second piston engaging to the end of said second elongated cylindrical shaft of said spool, means located in said valve body and around said first and second opposing elongated cylindrical shafts for sealing said high temperature, high pressure fluid in said first and second formed passageways, said first piston being responsive to a low pressure signal from said control system for driving said spool towards said second valve seat so as to firmly engage said second spool seat against said second valve seat to seal said high pressure, high temperature fluid in said [first] *second* passageway for delivery to said second outlet port, and said second piston being responsive to a low pressure signal from said control system for driving said spool towards said first valve seat so as to firmly engage said first spool seat against said first valve seat to seal said high pressure, high temperature fluid in said [second] *first* passageway for delivery to said [second] *first* outlet port, said sealing of said spool against said first and second valve seals being made under said high pressure and said high temperature without internal volume change in said valve.

8. The three-way valve of claim 7 wherein said first and second valve seats each comprise a ninety degree transition between said central cylindrical region and said opposite elongated cylindrical regions of said formed cavity.

9. The three-way valve of claim 7 wherein said first and second valve seats each comprise an angle of transition between said central cylindrical region and said opposite elongated cylindrical regions of said formed cavity that is larger than the angle of said first and second spool seats.

* * * * *